United States Patent
Lu et al.

(10) Patent No.: US 7,941,660 B2
(45) Date of Patent: May 10, 2011

(54) SYSTEM AND METHOD FOR DATA COMMUNICATIONS ALLOWING SLAVE DEVICE TO BE NETWORK PEERS

(75) Inventors: HongQian Karen Lu, Austin, TX (US); Michael A. Montgomery, Austin, TX (US)

(73) Assignee: Gemalto SA, Meudon (FR)

( * ) Notice: Subject to any disclaimer, the term of this patent is extended or adjusted under 35 U.S.C. 154(b) by 1179 days.

(21) Appl. No.: 11/352,881

(22) Filed: Feb. 13, 2006

(65) Prior Publication Data

US 2006/0149963 A1 Jul. 6, 2006

Related U.S. Application Data

(63) Continuation-in-part of application No. 10/848,738, filed on May 19, 2004, now Pat. No. 7,509,487.

(60) Provisional application No. 60/652,342, filed on Feb. 11, 2005, provisional application No. 60/520,022, filed on Nov. 13, 2003.

(51) Int. Cl.
*H04L 29/06* (2006.01)
(52) U.S. Cl. .................................. 713/151; 713/320
(58) Field of Classification Search .................. 713/320, 713/151
See application file for complete search history.

(56) References Cited

U.S. PATENT DOCUMENTS

| | | |
|---|---|---|
| 4,631,666 A | 12/1986 | Harris et al. |
| 4,777,355 A | 10/1988 | Takahira |
| 4,796,025 A | 1/1989 | Farley et al. |
| 4,816,653 A | 3/1989 | Anderl et al. |
| 4,939,353 A | 7/1990 | Iijima |
| 5,101,410 A | 3/1992 | Niimura et al. |
| 5,369,760 A | 11/1994 | Iijima |
| 5,651,116 A | 7/1997 | Le Roux |
| 5,682,027 A | 10/1997 | Bertina et al. |
| 5,761,309 A | 6/1998 | Ohashi et al. |
| 5,790,885 A | 8/1998 | Shona |
| 5,796,832 A | 8/1998 | Kawan |
| 5,889,963 A | 3/1999 | Gopal et al. |
| 5,987,018 A | 11/1999 | Freeburg et al. |
| 6,011,976 A | 1/2000 | Michaels |

(Continued)

FOREIGN PATENT DOCUMENTS

CA 2307020 A1 2/2000

(Continued)

OTHER PUBLICATIONS

Christophe Chausset, "Serial PC/SC Smart Card Reader Application with TDA8029".*

(Continued)

*Primary Examiner* — Gilberto Barron, Jr.
*Assistant Examiner* — Cordelia Zecher
(74) *Attorney, Agent, or Firm* — The Jansson Firm; Pehr B. Jansson

(57) ABSTRACT

A system and method for peer-to-peer communication between a slave device and network resources wherein the slave device, for example, a smart card, communicates using a protocol designed to allow the smart card to communicate over a half-duplex serial communications link while appearing to applications and network nodes as being a full-fledged network node in a manner that conserves power so as to be suitable for deployment on small portable devices.

23 Claims, 9 Drawing Sheets

U.S. PATENT DOCUMENTS

| | | | |
|---|---|---|---|
| 6,012,634 A | | 1/2000 | Brogan et al. |
| 6,157,966 A * | | 12/2000 | Montgomery et al. ........... 710/8 |
| 6,247,644 B1 * | | 6/2001 | Horne et al. ................. 235/380 |
| 6,297,724 B1 | | 10/2001 | Bryans et al. |
| 6,463,095 B1 | | 10/2002 | Kataoka et al. |
| 6,480,935 B1 | | 11/2002 | Carper |
| 6,662,286 B2 | | 12/2003 | Kusakabe et al. |
| 7,509,487 B2 | | 3/2009 | Lu et al. |
| 2001/0051049 A1 | | 12/2001 | Horiguchi |
| 2003/0086542 A1 | | 5/2003 | Urien |
| 2004/0041029 A1 | | 3/2004 | Postman et al. |

FOREIGN PATENT DOCUMENTS

| | | |
|---|---|---|
| EP | 0356237 A | 2/1990 |
| EP | 0427465 A | 5/1991 |
| EP | 0662674 A | 7/1995 |
| FR | 2667419 A | 4/1992 |

OTHER PUBLICATIONS

Harry Newton, Newton's Telecom Dictionary, Feb. 2002, CMP Books, 18th Edition, p. 577.

Microsoft Corporation, Microsoft Computer Dictionary, 2002, Microsoft Press, 5th Edition, p. 38.

Muller et al, "Smart Cards as 1st-Class Network Citizens", 4th Gemplus Developer Conference, Singapore, 'online! Nov. 12, 2002, p. I-8, XP002317968 Retrieved from the Internet: URL www.gemplus.com/smart/rd/publications> 'retrieved Feb. 15, 2005! Whole document.

Urien, "Internet card, a smart card as a true Internet node", Computer Communications, Elsevier Science Publishers BV, Amsterdam, NL, vol. 23 No. 17, Nov. 1, 2000, pp. 1655-1666, XP004238469 ISSN:0140-3664, whole document.

Urien et al., "draft-urien-eap-smartcard-02.txt: EAP—Support in Smart Card", STANDARDWORKINGDRAFT, Jun. 2003, pp. 1-27, XP015005569 paragraph 008-9.2, 014-14.3.

Guthery et al.: "draft-guthrey-ip7816-01: IP and ARP over ISO 7816", Network Working Group Internet Draft, Jan. 2001, pp. 1-8, XP002317969, Whole document.

PCT/US2006/004925 International Search Report Jun. 8, 2006, whole document. European Patent Office, P.B. 5818 Patentlaan 2 NL-2280 HV Rijswijk.

PCT/US2006/004925 Written Opinion of the International Searching Authority Jun. 8, 2006, whole document. European Patent Office—D-80298 Munich.

PCT/IB98/01162 International Search Report, Feb. 22, 1999, European Patent Office, P.B. 5818 Patentlaan 2 NL-2280 HV Rijswijk.

* cited by examiner

SYSTEM AND METHOD FOR DATA COMMUNICATIONS ALLOWING SLAVE DEVICE TO BE NETWORK PEERS

CROSS-REFERENCE TO RELATED APPLICATIONS

This invention claims priority pursuant to 35 U.S.C. 119 of U.S. Provisional Patent Application Ser. No. 60/652,291, filed on Feb. 11, 2005. This Provisional Application is hereby incorporated by reference in its entirety.

In co-pending U.S. application Ser. No. 10/848,738, titled "Secure Networking Using a Resource-Constrained Device", filed on May 19, 2004, assigned to the assignee of the present invention and incorporated herein by this reference, there is described a system and method for providing communication between a resource-constrained device that communicates using a half-duplex communications channel and remote nodes connected to a network. The present invention provides improvements upon the inventions described therein.

In co-pending U.S. patent application Ser. No. 11/234,577, titled "Communications of UICC in mobile devices using Internet Protocols", filed on Sep. 23, 2005, assigned to the assignee of the present invention and incorporated herein by reference, is described a system and method for allowing a UICC in a mobile device to act as a network peer.

In co-pending U.S. patent application Ser. No. 09/727,174, titled "Smart Card Control of Terminal and Network Resources", filed on Nov. 30, 2000, continuation of U.S. patent application Ser. No. 09/107,033, filed on Jun. 29, 1998, now U.S. Pat. No. 6,157,966, is described a system and method for asynchronous communication between a resource-constrained device and a host device communicating on a half-duplex communications channel yet allowing the resource-constrained device to act as a peer with the host device.

TECHNICAL FIELD

The present invention relates to the operation of network-based electronic devices, and more particularly, to systems and methods for allowing devices that are traditionally slaves to be network peers.

BACKGROUND OF THE INVENTION

In the new information age, computing is becoming pervasive. Classes of machines that hitherto were entirely "dumb" machines are acquiring some level of "intelligence". As that trend continues, there are also higher levels of expectation placed on the machines. For example, where previous generations of machines were not expected to have any computing capability, subsequent generations have some degree of computerization. A further step in this evolution is connecting machines to networks. However, often either because of physical size constraints or because computing power and data storage are not the main function of a machine, the computational power and memory size may be very limited. These constraints have a great impact on the ability of such resource-constrained devices to interact with other nodes on a network.

An example of such a resource-constrained device is the smart card. A smart card is simply a plastic card containing an integrated circuit with some memory and a microprocessor. Typically the memory is restricted to 6 K bytes of RAM. It is anticipated that smart card RAM may increase by a few kilobytes over the next few years. However, it is very likely that memory size will continue to be an obstacle to smart card applications. Most smart cards have 8-bit microprocessors.

Communications infrastructure presents another resource constraint on smart cards and similar devices. Smart cards do not have full speed USB communications, and lack full duplex serial interfaces. Currently smart cards use the ISO-7816 interface which operates at half duplex.

There are other devices with similar resource limitations. These include USB dongles (such as the iKey device sold by SafeNet, Inc., Belcamp, Md.), or SD Cards, or secure integrated circuit chips soldered directly to PC motherboards.

Herein, devices that have in common similar resource limitations, e.g., RAM limited to less than 64 K, shall be referred to as "resource-constrained devices". Resource-constrained devices include smart cards, USB dongles, SD cards and secure integrated circuit chips attached directly to PC motherboards. Furthermore, the term resource-constrained device shall include any other devices that have similar resource constraints to these enumerated devices. For the sake of lucidity, the invention is described herein primarily in the context of smart cards. This must not be construed to limit the scope or applicability of the invention as it is equally applicable to other resource-constrained devices.

Smart cards have been used with a terminal or a host, which may be a computer having a smart card reader, or a cell phone, or other devices. When smart cards are connected to computers, host applications cannot communicate with them using standard mainstream network interfaces. Specific hardware and software in the form of smart card reader device drivers and middle-ware applications are needed to access the card services.

The co-pending and co-assigned patent application Ser. No. 10/848,738 titled "Secure Networking Using a Resource Constraint Device," describes a new protocol called Peer I/O, which enables smart cards and other resource-constrained devices using half-duplex serial command/response communication protocol to handle full-duplex peer-to-peer communications (hereinafter, the "'738" application). Thus, such a device deploying Peer I/O may join a network as a network peer.

It would be useful to have a system and method that is generally applicable to enable devices that communicate using half-duplex serial command/response communications protocols to handle asynchronous full-duplex peer-to-peer communications.

There is a current trend that is likely to continue to make electronic communications devices portable, small and wireless. One challenge that follows from that trend is that by virtue of being wireless, the device must carry its own power source, typically a battery. Because that battery is a diminishing resource until the device is again connected to a wired power source, the duration of available power, or simply, battery life, is a major issue. A selling factor for portable devices is their size. Of course, the smaller the device, the smaller the battery, and consequently, the shorter the battery life.

One very common resource-constrained device is the SIM module for mobile telephones. During the last several years, mobile telephones have been provided with many new features and functionality. Co-pending and co-assigned patent application Ser. No. 11/234,577, titled "Communications of UICC in mobile devices using Internet Protocols", describes applications in which the SIM card may act as a network peer, for example, by executing a web server on the SIM card. Power consumption and its related effect, battery life, are very important in the context of mobile telephones. It is therefore desirable to have a system and method for allowing electronic devices that communicate using half-duplex serial command/response to handle asynchronous full-duplex peer-to-peer communications while conserving power and thereby extending the mobile devices battery life.

From the foregoing it will be apparent that there is still a need for an improved system and method to allow full-duplex peer-to-peer communication by a network attached resource-constrained device that communicates using a half-duplex serial command/response communications link while conserving the power consumption imposed by that resource-constrained device on a mobile device to which it is connected.

SUMMARY OF THE INVENTION

In a preferred embodiment, the invention provides a system and method for peer-to-peer communication between a slave device and network resources wherein the slave device, for example, a smart card, communicates using a protocol designed to allow the smart card to communicate over a half-duplex serial command/response communications link while appearing to applications and network nodes as being a full-fledged network node in a manner that conserves power so as to be suitable for deployment on small portable devices.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
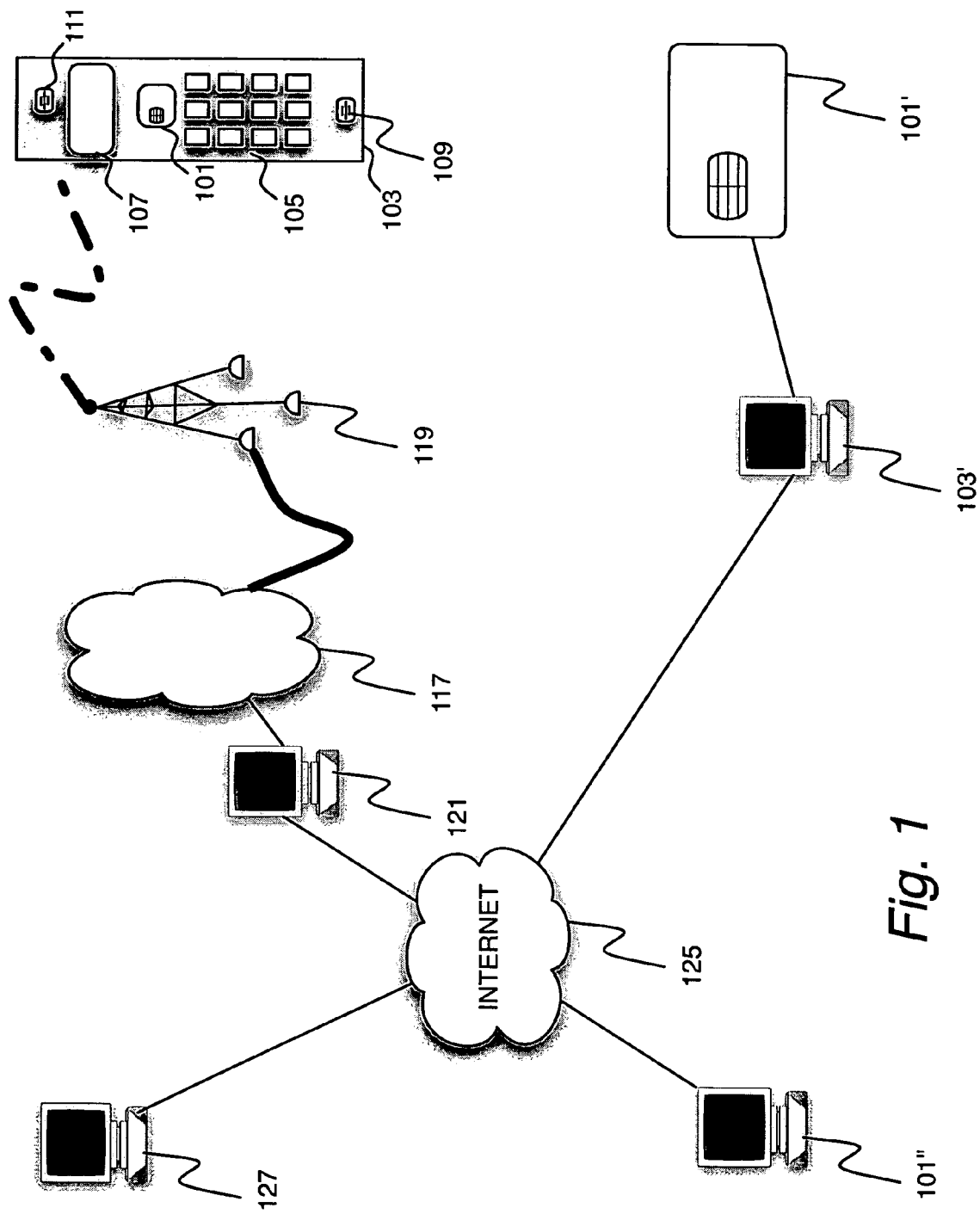
FIG. 1 is a schematic illustration of the operating environment in which a network-connected electronic device according to the invention may be deployed.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

As shown in the drawings for purposes of illustration, the invention is embodied in a network enabled electronic device, e.g., a network smart card, equipped with the capability of providing peer-to-peer communication for a network enabled electronic device while minimizing power consumption.

FIG. 1 is a schematic illustration of the operating environment in which a network-connected electronic device according to the invention may be deployed.

In one example, a network-enabled electronic device 101 is a network smart card installed into a handset 103. The handset 103 may be a mobile telephone having the usual accoutrements of a mobile telephone such as a keypad 105, a display 107, a microphone 109 and a speaker 11. In alternative embodiments, the handset 103 may be a personal digital assistant or any other mobile device using a SIM card. The handset 103 also contains an electronic circuitry (not shown) including a central processing unit and memory. Furthermore, there are a variety of smart mobile devices available, such as web-enabled phones, smart phones, PDAs, handheld PCs and tablet PCs. Many of the smart phones and PDAs combine the cell phone and PDA functionalities. Popular operating systems for smart mobile devices include Symbian, Palm OS, and Microsoft Smartphone. The invention described herein is applicable to such devices if they have SIM device that is a network smart card 101.

The electronic circuitry provides communications functionality for the handset 103 with a wireless network 117 via a wireless link to a wireless telephony antenna 119. And the microprocessor provides some of the control functionality of the handset 103, such as managing operations of the handset 103 and managing communications protocols used to communicate with the wireless network 117. The network smart card 101 is connected to the electronic circuitry so as to allow communication between the network smart card 101 and the handset 103.

The wireless network 117 is composed of a complex communications infrastructure for providing connections to other stations, for example, other mobile stations or land-based telephone systems. One such station may be an Internet gateway 121, which gives the wireless network 117 access to the Internet 125. As commonly known, very many computers are connected via the Internet. In the scenario presented herein, a user of a handset, e.g., a mobile telephone or a PDA, uses the infrastructure illustrated in FIG. 1 to communicate with the network smart card 101 either via the handset 103 or some other computer connected to the Internet 125. Some aspect of this communication uses direct communication between the network smart card 101 and the remote entity 127, for example, for the purpose of communicating some information that is stored on the network smart card 101 to the remote entity 127.

Another example, of a network-connected electronic-device 101' is a network smart card having a credit card form factor and which is connected to the Internet 125 via a host computer 103'.

A network smart card 101 or 101' is a smart card that is capable to act as an autonomous Internet node. Network smart cards are described in co-pending patent application Ser. No. 10/848,738 "SECURE NETWORKING USING A RESOURCE-CONSTRAINED DEVICE", filed on May 19, 2004, the entire disclosure of which is incorporated herein by reference. A network smart card 101 implements Internet protocols (TCP/IP) and security protocols (SSL/TLS) built into the card and may implement other communications protocols as described herein below. The network smart card 101 can establish and maintain secure Internet connections with other Internet nodes. The network smart card 101 does not depend on a proxy on the host to enable Internet communications. More over, the network smart card 101 does not require local or remote Internet clients or servers to be modified in order to communicate with the smart card.

The invention is also applicable for use in other devices, including other network-enabled resource-constrained devices, and is not necessarily limited in use to resource-constrained devices. For example, a network-enabled electronic-device according to the invention may be a computer 101". Herein, the term network-enabled electronic-device refers to any electronic device that is connected via a network to other electronic-devices and is capable of communicating electronically with such other devices. Similarly, the reference numeral 101 is used to refer to any such device and not specifically to any one such device.

The network-connected electronic device may be a network smart card, e.g., smart card 101'. Network smart cards, which are described in co-pending patent application Ser. No. 10/848,738 "SECURE NETWORKING USING A RESOURCE-CONSTRAINED DEVICE", filed on May 19, 2004, the entire disclosure of which is incorporated herein by reference, combine the functionality of traditional smart cards with the capability of acting as autonomous network nodes by implementing a communications protocol stack used for network communication. In the event that the network-connected electronic device 101 connects to the network via a host computer 103', the host computer 103' may be the attacking computer, for example, as a reflector or by having some malware installed thereon.

Figure 2:
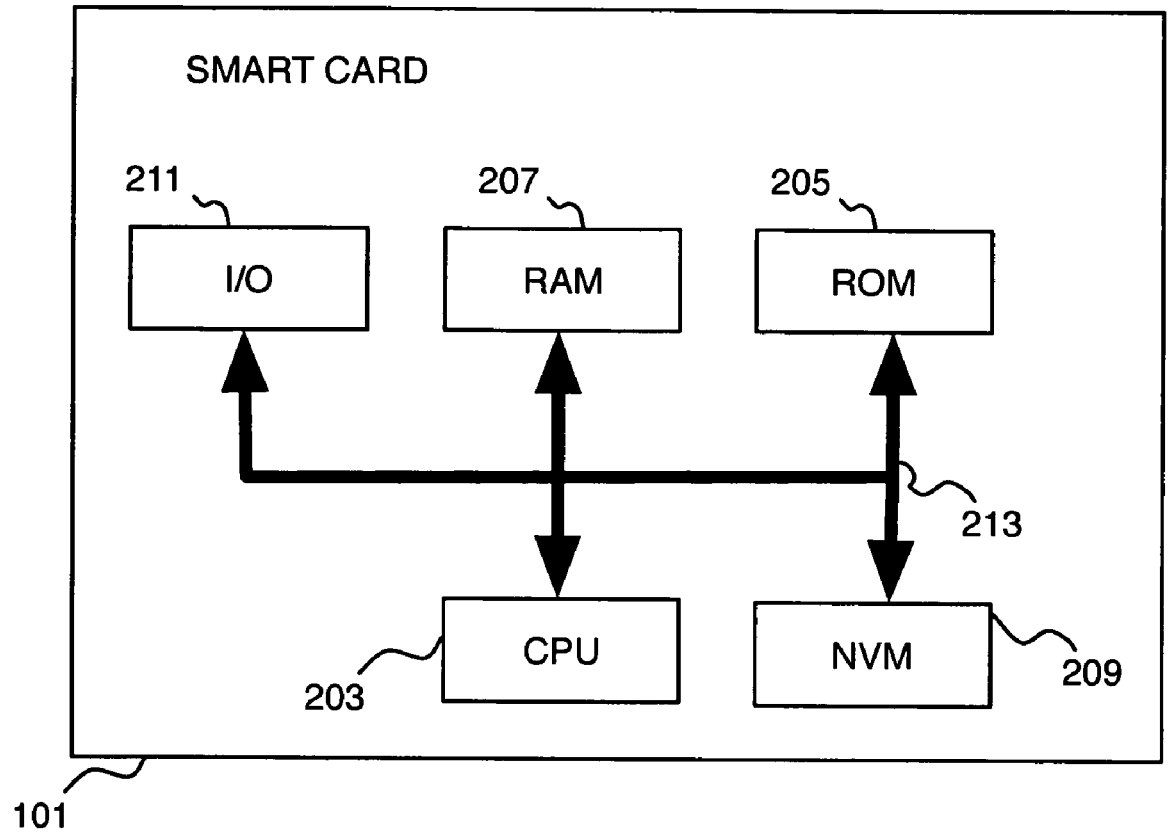
FIG. 2 is a schematic illustration of an exemplary architecture of the hardware of a network-connected electronic device 101 that may be used in conjunction with the invention.

FIG. 2 is a schematic illustration of an exemplary architecture of the hardware of a network-connected electronic device 101 that may be used in conjunction with the invention. The network-connected electronic device 101, according to the example of FIG. 2, has a central processing unit 203, a read-only memory (ROM) 205, a random access memory (RAM) 207, a non-volatile memory (NVM) 209, and a communications interface 211 for receiving input and placing output to a computer network, e.g., the Internet, to which the network-connected electronic device 101 is connected, either directly or via intermediary devices, such as a host computer 103'. These various components are connected to one another, for example, by bus 213. In one embodiment of the invention, a communications module 321 (introduced in FIG. 3 below and described herein below in conjunction with FIG. 3 and other figures herein), as well as other software modules described herein below, would be stored on the resource-constrained device 101 in the ROM 205. In alternative embodiments, the software modules stored in ROM 205 would be stored in a flash memory or other types of non-volatile memory. For purposes of illustration, the invention is described using the ROM example. However, that should not be construed as a limitation on the scope of the invention and wherever ROM is used, flash memory and other types of non-volatile memory can be substituted as an alternative.

The ROM 205 would also contain some type of operating system, e.g., a Java Virtual Machine. Alternatively, the communications module 321 would be part of the operating system. During operation, the CPU 203 operates according to instructions in the various software modules stored in the ROM 205 or NVM 209.

Thus, according to the invention, the CPU 203 operates according to the instructions in the communications module 321 to perform the various operations of the communications module 321 described herein below.

Figure 3:
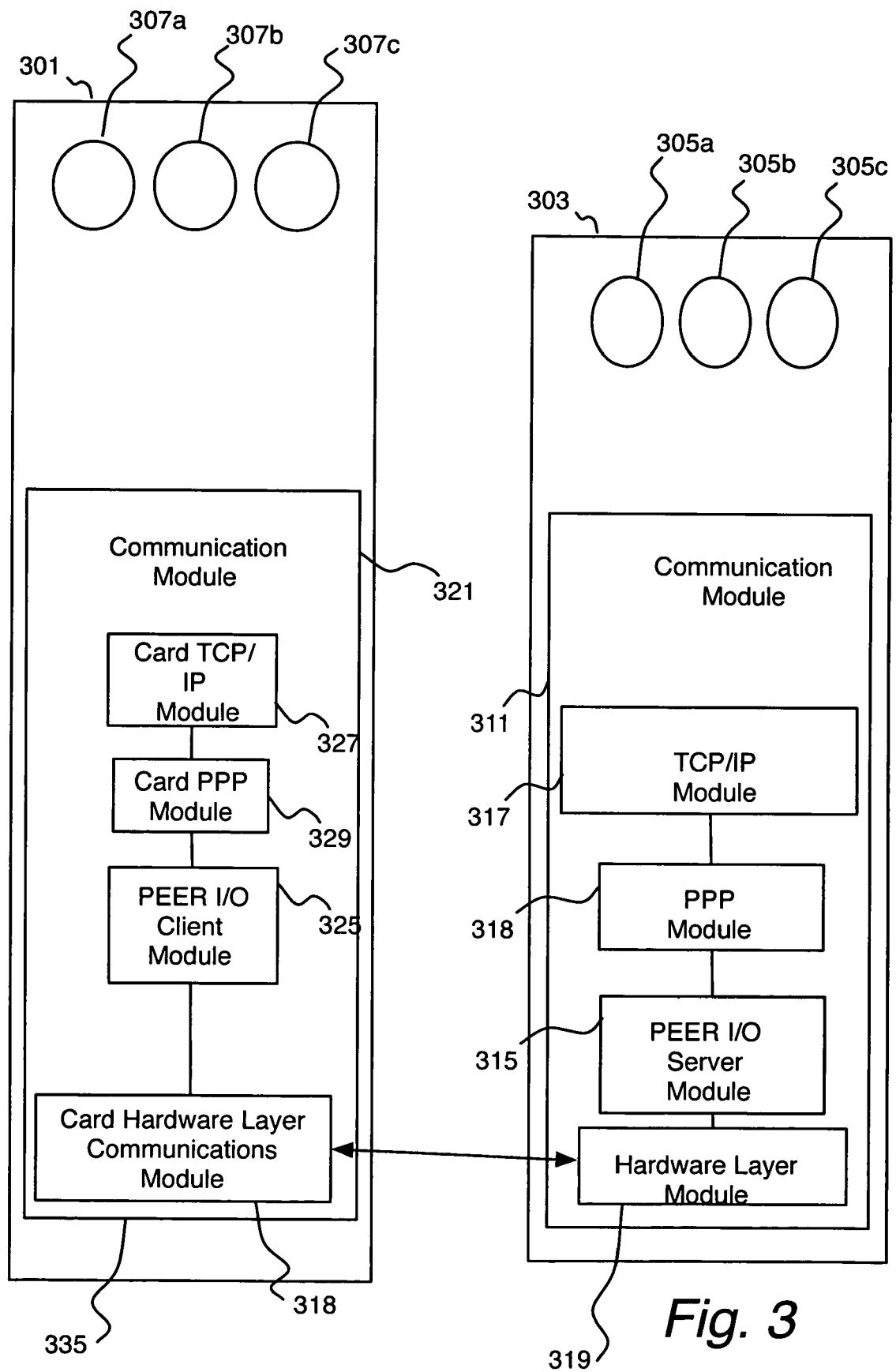
FIG. 3 is a schematic illustration of the software architecture implementation for a resource constrained device and a host computer.
Figure 4:
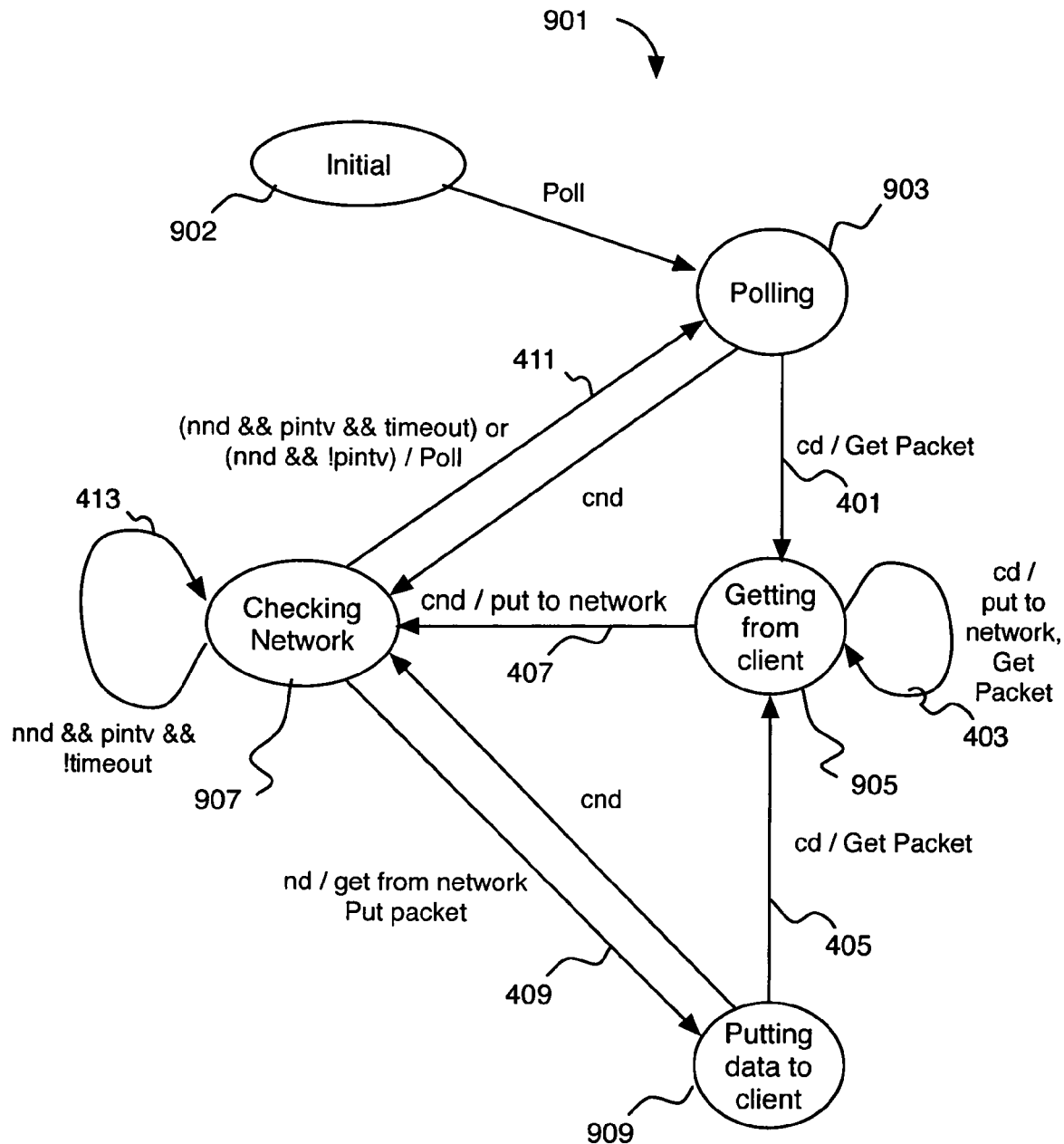
FIG. 4 is a schematic illustration of the finite state machine that controls the behavior of the Peer I/O server.

FIG. 3 is a schematic illustration of the software architecture for a resource constrained device 301 and a host computer 303. In the context of FIGS. 1 and 2, the resource constrained device 301 may be the SIM card 101 or a network smart card 101', and the handset 303 may be the handset 103 or the host computer 103'.

The host computer 303 has loaded thereon several network applications 305a, 305b, and 305c. (Note: In the case of a handset 103, the handset physical architecture is much like that of a computer. Thus, the handset 103 has a memory and a processor. The memory may be composed of RAM, ROM, EEPROM, etc. The memory contains the software modules that control the behavior of the processor. Thus, the various software modules illustrated in FIG. 3 as being part of host computer 303 are usually stored in some non-volatile memory of the mobile device and loaded into the RAM while being executed. From there the software module instructions control the behavior of the processor and causes the mobile device to do certain things, e.g., establish network connections.) Examples of such applications include web browser, and network contacts list application. In the case of a web browser, an application 305a may be used to access the resource constrained device 301, or more accurately, communicate with a web server executing on the resource constrained device 301, e.g., SIM card network application 307a.

The host computer 303 and the resource constrained device 301 communicate over several layers of communication protocols. In one embodiment, these layers may be represented by several communicating software modules, e.g., a TCP/IP Module 317 for handling communications at the TCP/IP level on host computer 303 and a corresponding TCP/IP Module 327 on the resource-constrained device 301, PPP modules 318 and 329 for handling communications at the PPP level, and a Peer I/O Server module 315 on the host computer 303 and a corresponding Peer I/O client module 325 on resource-constrained device 301 for communicating according to the Peer I/O protocol. The operation of the Peer I/O client module 325 and Peer I/O server module 315 are described in greater detail herein below.

The resource-constrained device 301 and host computer 303 are also connected as a hardware layer, e.g., through a USB or wireless connection, and accordingly have hardware communications modules 318 and 319 for managing hardware level communication.

The host computer 303 may establish connection with the outside data network and may support several applications 305a-c. The application programs on the host computer use a communications module 311 to establish connections to outside network and to communicate with applications 307a-c on the resource constrained device 301.

Communication between the resource constrained device 301 and the network via the host computer 303 is described in greater detail in hereinabove referenced co-pending patent application Ser. No. 10/848,738 entitled "SECURE NETWORKING USING A RESOURCE-CONSTRAINED DEVICE", filed May 19, 2004, which is incorporated herein by reference. The virtual serial port 313 implements the serial port interface that is defined by the operating system of the handset 303. Communication between a network SIM card (also known as a network UICC card) is described in greater detail in co-pending patent application Ser. No. 11/234,577 "COMMUNICATIONS OF UICC IN MOBILE DEVICES USING INTERNET PROTOCOLS," filed on Sep. 23, 2005, which is incorporated herein by reference.

The Peer I/O implementation is resident on both the host 303 and the device 301. On the host side, the Peer I/O provides services to forward messages between the device 301 and the network 117. Herein this service module is referred to as the Peer I/O Server 315. The device 301 contains a Peer I/O client 325 that is located above the low-level half-duplex serial communication protocol 318 operating in a command/response mode and below the full duplex protocols, such as PPP 329. Such full-duplex communication is asynchronous because both ends of the communication channel can send at anytime without synchronization with the other end or timing. The Peer I/O protocol is independent of the higher level protocol it carries. From an upper layer protocol point of view, Peer I/O can carry messages to and from both directions. For example, we can use Peer I/O to carry PPP frames or Ethernet frames or IP datagrams. In other words, the fact that data communication between the resource-constrained device 301 and the host 303 is performed over a half-duplex serial command/response link is transparent to the upper level applications and communications protocols on both the resource-constrained device 301, the host 303 and on other network nodes that may be in communication with the resource-constrained device 301.

When a computer over the network (or simply to say "the network") sends a message to the device, Peer I/O server 315 forwards the message by sending one or more commands of the command/response communication protocol containing the message to the device 301. To enable the device 301 to send a message to the network 117 whenever it needs to send, the Peer I/O server 315 polls the device 301 regularly. When the device has a message, the Peer I/O server 315 issues one or more commands to get the device's message and forward it to the network. The operation of the device 301 and 303 to effect the communication over the half-duplex serial command/response link that connect these devices is controlled by the Peer I/O server 315 and the Peer I/O client 325. In one embodiment of the invention this behavior is implemented according to a finite state machine on the resource-constrained device 301 and on the host device 303. The Peer I/O Finite State Machines enable the communication to performed using upper level messages of any length without using an explicit fragmentation and assembly mechanism.

Peer I/O Protocol Format

The Peer I/O protocol defines three commands: Put Packet, Get Packet, and Poll. The Put Packet command sends data from the host to the device. The Get Packet command gets data from the device to the host. The Poll command is used for the host to check with the device to see if the device has data to send. The implementation of these commands is protocol dependent. When feasible, the Poll command may be implemented as Put Packet command with no data. In this case, the Peer I/O protocol only requires two commands: Put Packet and Get Packet.

The Peer I/O command type may be represented by one byte or two bits, or even one bit, depending on the underlying protocol. The Put Packet command typically has the following format:

| Put Packet | Length | Data |
| --- | --- | --- | where the Length is the length of the data to send from the host to the device. After receiving the Put Packet command from the host, the device gets the data and returns a status.

The Get Packet command typically has the following format where the Length is the length of the data to get from the device to the host.

| Get Packet | Length |
| --- | --- |

After receiving the Get Packet Command from the host, the device sends data of the required length to the host and then sends a status.

The Poll command typically does not require a parameter. After receiving a Poll command from the host, the device sends a status.

The status returned from the device to the host may represent several things including the following:
Has data of length n to send.
No data to send.
No data to send; set polling interval. The polling interval may be infinite, which means "do not poll, I am waiting for data."

The underlying protocol typically limits the length of the data within a packet. For example, some protocol limits the data to 256 bytes. The Peer I/O protocol respects the limit of the underlying protocol. It enables to send and to receive larger packets by issuing multiple put or get commands as needed. The Peer I/O protocol assumes that the upper layer protocol knows the boundary of its packets.

Operations of the Peer I/O Protocol

This section describes some typical operations of the Peer I/O protocol. When the network sends data to the device, the Peer I/O server 315 issues a Put Packet command to the device.

| Put Packet | Length | Data |
| --- | --- | --- |

When the device wants to send a data to the network, it has to wait for its opportunity. The Peer I/O Server 315 regularly polls to give the device opportunities to send. The server issues a POLL command.

| POLL |
| --- |

After receiving a command from the Peer I/O Server 315, if the device has no data to send, it sends a status indicating so. If the device has data to send, it sends the "has data" status and the length of data that the device intends to send.

When the Peer I/O server 315 receives the status indicating that the device has data to send, it issues a Get Packet command.

| GET_PACKET | Length |
|---|---|

The device responds with a response containing data.

| Data | Status |
|---|---|

When the Status indicating more data to send, the Peer I/O Server 315 can issue another Get Packet command.

Controlled Polling

The Peer I/O Server 315 in the host polls the device regularly to see if the device has data to send. This polling is controlled by a polling interval, which may be infinite. Such controlled polling reduces the power consumption that would occur if the device 301 were continuously polled by the host 303.

The Peer I/O defines a new return status that allows specifying the polling interval. The default polling interval is "as often as possible". The interval may be specified in seconds, minutes, or hours. The Peer I/O Server 315 will poll as closely as possible to the polling interval. The polling interval can also be infinite. The device may specify infinite polling interval when it is waiting to receive data. In this case, the Peer I/O server 315 will not poll the device and only contact the device when there is data available for the device. For example, if the device is a web server, when it waits for a client connection, the device may set the polling interval to infinite. This new addition to the Peer I/O is very important for mobile applications; for example when the host is a small mobile device running with a battery and the device consumes the power supplied by the host.

As an example, the return status may be represented by two octets. The most significant 4 bits represent "has data" or "no data". For "has data" case, the rest of the bits may represent the length of the data. For "no data" case, if all the rest of the bits are 0's, it means, "use current polling interval", which may be the default polling. If all the rest of the bits are 1's, it means, "do not poll". Otherwise, the next two bits represent the unit of the polling interval, such as second, minute, or hour. The rest of the ten bits represent the polling interval.

For example, the following figure illustrates the return status for no data case.

| 15 | 12 11 | 10 9 | 0 |
|---|---|---|---|
| no data | time unit | polling interval length | |

The following figure illustrates the return status for having data-case.

| 15 | 12 11 | 10 9 | 0 |
|---|---|---|---|
| has data | RFU | data length | |

Operation of the Peer I/O server 315 and the Peer I/O client 325 are controlled by two finite state machines, respectively.

Figure 9:
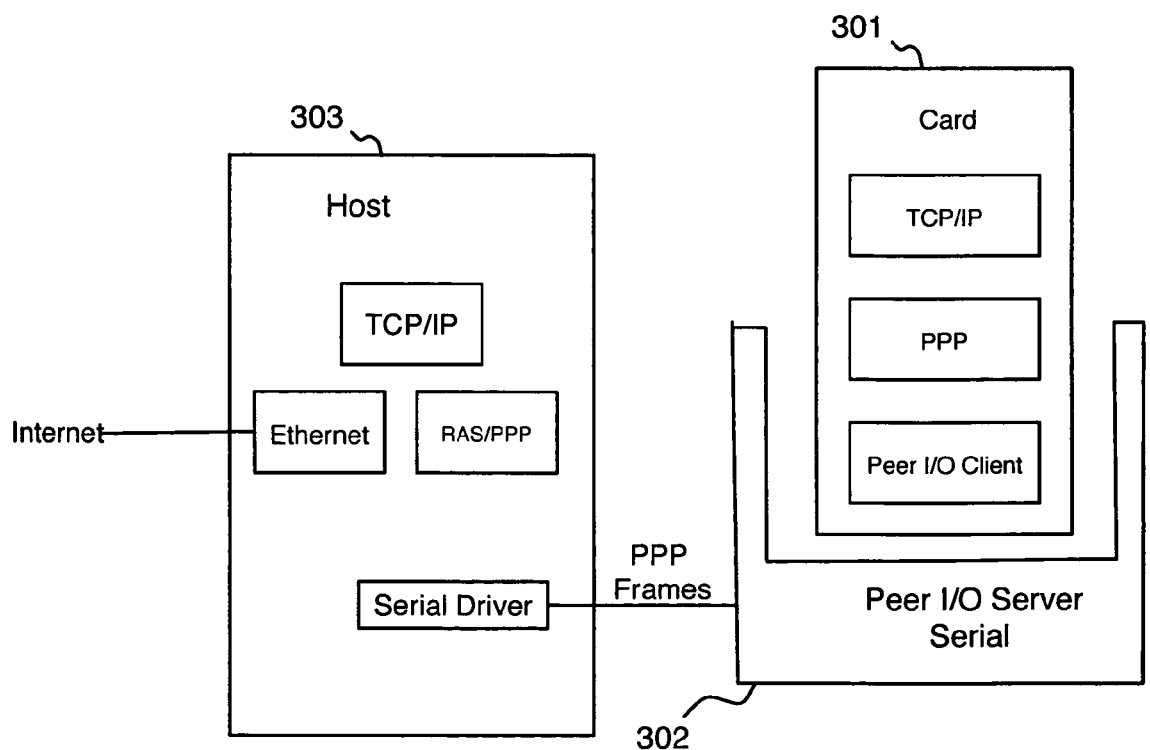
FIG. 9 is a schematic illustration of the components for implementing communication between a smart card and a network wherein the smart card communicates to a hardware interface device over a half-duplex serial connection and the interface communicates to the host computer using a full-duplex connection.

FIG. 9 is a schematic illustration of the finite state machine 901 that controls the behavior of the Peer I/O server 315.

The finite state machine (FSM) 901 has five states:
Initial state 902;
Polling 903;
Getting from client 905;
Putting data to client 909; and
Checking Network for data 907.
There are four events:
Four kinds of return status from client:
Client has data. (cd)
Client has no data; not change polling interval. (cnd)
Client has no data; changing polling interval. (cnd+p)
Client has no data; do not poll. (cnd+np)
Two results from checking network:
Network has no data. (nnd)
Network has data. (nd)
There are four actions:
Get packet from client.
Put packet to client.
Get packet from network.
Put packet to network.

The Peer I/O server 315 starts by polling the Peer I/O client 325. In response thereto, the client 325 may indicate whether it has data transmit and a polling interval for the Peer I/O server 315 to wait prior to again transmitting to the Peer I/O client 325.

Whenever the Peer I/O client 325 returns a status (cd), transition 401, that is an indication that the client 325 has data to send. In response thereto, the Peer I/O server 315 gets data from the client 325 and forward the data to the network 117. The server 325 keeps getting data from client 315, by issuing Get_Packet actions, state 905, and forward data to the network as long as client 315 returns status cd, transition 403.

When the client returns a status that indicates the client has no data to send, by returning the value cnd, or ready to receive, the Peer I/O server 315 checks with the network, transition 407 to state 907. When the network has data, Peer I/O server 315 gets data from the network and forwards the data to the client 325, transition 409 to state 909. If the network has no data, nnd, Peer I/O server 315 may or may not poll the client 325 depending on the polling interval setting. For example, if the polling interval is set (pintv) and the elapsed time since the last transmission to the client 325 has reached the polling interval (timeout), then the Peer I/O server 315 polls the client 325, transition 411 to state 903; otherwise, i.e., if the polling interval has not been reached (!timeout), the server 315 remain at the "checking network" state 907, transition 413.

Figure 5:
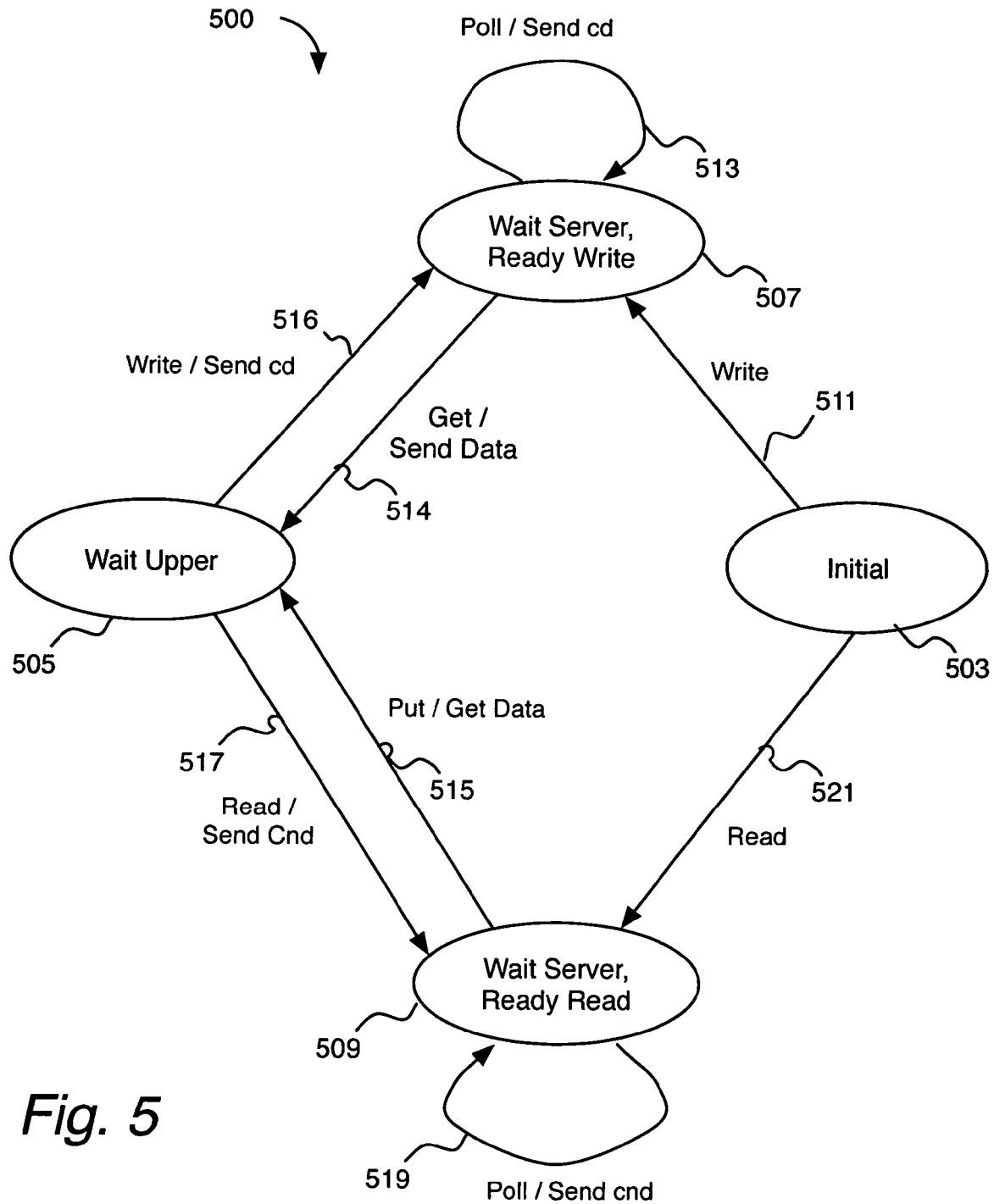
FIG. 5 is a schematic illustration of the finite state machine that controls the behavior of the Peer I/O client.

FIG. 5 is a schematic illustration of the finite state machine 501 that controls the behavior of the Peer I/O client 325.

The Peer I/O client state machine has four states:
Initial state, state 503
Waiting upper layer instruction (read or write), state 505
Ready write, waiting for Peer I/O server, state 507
Ready read, waiting for Peer I/O server, state 509
There are five events:
Read instruction from upper layer
Write instruction from upper layer
Poll command from Peer I/O server 315
Put command from Peer I/O server 315
Get command from Peer I/O server 315
There are four actions:
Send status "client has data" (cd) to Peer I/O server 315
Send status "client has no data" (cnd) to Peer I/O server 315
Client has no data; not change polling interval. (cnd)
Client has no data; changing polling interval. (cnd+p)
Client has no data; do not poll. (cnd+np)
Get data from Peer I/O server 315
Send data to Peer I/O server 315

The device 301 operates a Peer I/O client 325, which starts at the initial state 503. The upper layer, e.g., applications 307a-c communicating through the TCP/IP module 327, may either request to write or to read. For example, when the device 301 wants to initiate a connection to the network, the application 307 on the device 301 sends the first message to initiate connection (the Peer I/O protocol is independent of whether it is the device or host to initiate the connection). The Peer I/O client 325 leaves its "initial" state 503 and goes to "ready write" state 507 when the upper layer issues a write instruction, transition 511. While in the "ready write" state 507, the Peer I/O client 325 waits for the message from Peer I/O server 315. As discussed herein above, the server 315 starts by polling the client 325. When the server polls and the client 325 is in the ready-write state 507, the client 325 sends status cd, transition 513, with the number of bytes to be sent, and remains in the "ready write" state 507. When the server 315 issues a Get Packet command, the client 325 sends the data and moves to "wait upper" state 505 where it waits for upper layer instructions, transition 514.

If the upper layer issues "write" when the client 325 is in the "wait upper" state 505, the client 325 sends status cd to Peer I/O server 315 and moves to "ready write" state 507, transition 516. On the other hand, if the upper layer issues "read", the client 325 sends status cnd to Peer I/O server 315 and moves to "ready read" state 509, transition 517. The client 325 may also transition from the "initial" state 503 to the "ready read" state 509 if it receives a "read" instruction from the upper layer while the client 325 is in the "initial" state 503, transition 521. When at "ready read" state 509, the client 325 waits for the Peer I/O server 315 command. When the server 315 polls, the client 325 sends another cnd and remains in "ready read" state 509, transition 519. If the server 315 issues Put Packet command, the client 325 gets the data and moves to "wait upper" state 505, transition 515.

Applications

The Peer I/O protocol has many applications. A first example is connecting a network smart card to the Internet via a host computer.

A smart card is a small card that contains a microprocessor chip. ISO defines two form factors for smart cards: credit card-shaped cards and SIM (Subscriber Identification Module) cards. Smart cards are secure, portable and tamper resistant. They have served security purposes for a wide range of applications, including mobile communications (SIM card in cell phones), banking, physical access control, network access control, transportation, digital identity, and so on. Unfortunately, smart card communication standards do not match with those of mainstream computing, which has limited the success of smart cards.

The current smartcard standard ISO 7816 (ISO 14443 for contact-less smart cards) specifies a half-duplex serial command/response communication protocol, while standard Internet protocols, such as PPP, IP, and TCP, operate in a full-duplex and peer-to-peer mode. Applying the Peer I/O, enables the current smartcard compliant with ISO 7816 (or ISO 14443) standard to become an Internet node. This section describes the implementation of the Peer I/O using ISO 7816 commands.

Figure 6:
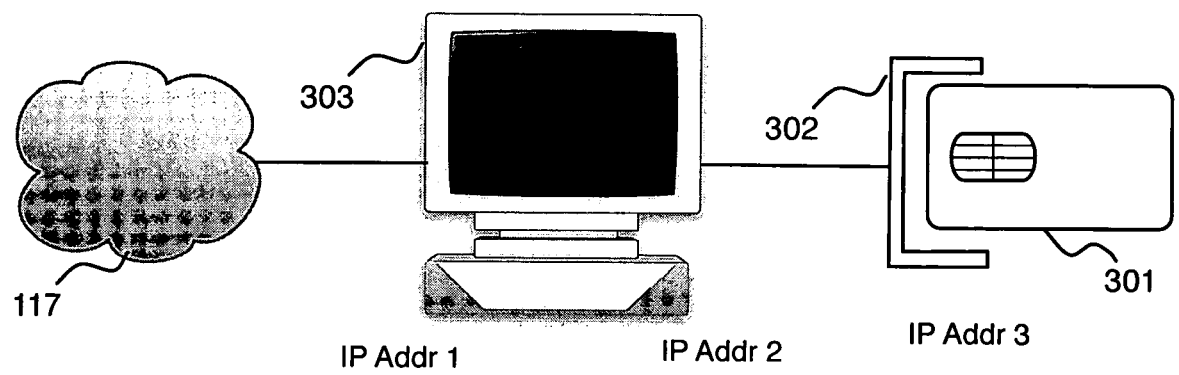
FIG. 6 is an illustration of a first alternative for connecting an infrastructureless network smart card according to the invention to a network.

FIG. 6 is an illustration of a first alternative for connecting an infrastructureless network smart card 301 according to the invention to a network 117. The infrastructureless network smart card 301 is connected to a reader 302 which is connected to a host computer 303. The computer 303 is connected to a network 117. The computer 303 acts as a router for routing Internet communications to and from the card 301. The computer 303 has a first IP address for its connection to the network 117 and a second IP address for connections to the infrastructureless network smart card 301. There is a third IP address associated with the infrastructureless network smart card 301. The third IP address may be either assigned to the card 301 or allocated dynamically.

The computer 303 has Remote Access Server (RAS) that provides Internet service to other computers connected to this computer. If the smartcard 301 would have full-duplex serial I/O, then just like other full-duplex serial device, the smart card with TCP/IP/PPP could establish Internet connection via RAS without loading any additional software on the computer 303. In reality, smartcards standard specifies half-duplex serial I/O. In addition to the full duplex vs. half-duplex problem, Internet protocols are peer to peer, meaning a node can talk at wish, while ISO 7816 and ISO 14443 protocols specify command/response operation where the smartcard only respond to the command issued by the terminal. The Peer I/O protocol implemented according to the invention solve both of these protocol mismatch problems.

The Peer I/O implementation according to the invention exists as cooperating communications modules on the host computer 303 (or the reader 302) and in the smart card 301. The host computer (or the reader) contains the Peer I/O Server 315 that provides services to forward messages between the card and the Remote Access Server (RAS) on the host. The card contains Peer I/O client that sits above ISO 7816 and below other protocols, such as PPP.

When RAS sends a message to the card, the Peer I/O Server 315 forwards the message by sending one or more APDU commands containing the message to the card. To enable the card to send a message to RAS, the Peer I/O server 315 polls the card regularly according to the polling interval.

Figure 7:
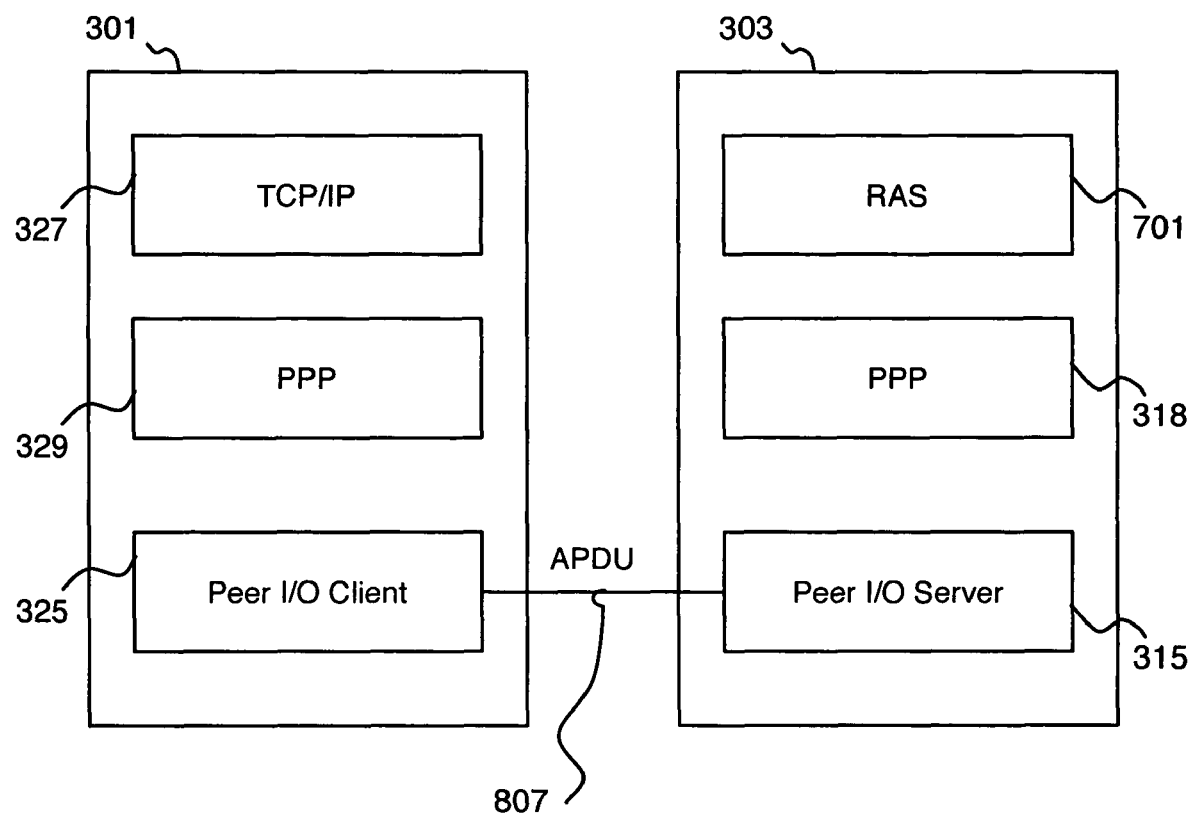
FIG. 7 is a high-level schematic diagram of the communications protocol stack, a host computer and a network smart card implementing the Peer I/O protocol in which APDU carries PPP frames.

FIG. 7 is a high-level schematic diagram of the communications protocol stacks a host computer 303 and a network smart card 301 implementing the Peer I/O protocol.

In embodiments of the invention that include the link-layer protocol introduced herein as Peer I/O, a Peer I/O module resides in both the host computer 303 (or reader 302) and in the card 301. The protocol stack on the host PC side 303, a Peer I/O server module 315 implements the Peer I/O protocol layer and provides services to forward messages between the card 301 and a Remote Access Server (RAS) 701 on the host computer 303. On the smart card 301 side, the protocol stack contains a Peer I/O protocol layer 325 that sits above APDU 807 and below other protocols, such as PPP 329. APDU provides the communications between the host 303 and the card 301. The Peer I/O protocol is independent of the Internet protocol it carries. From an upper layer protocol point of view, Peer I/O can carry messages to and from both directions. For example, Peer I/O can be used to carry PPP frames or Ethernet frames or IP datagrams. Peer I/O uses APDU to carry messages, such as PPP frames, Ethernet frames or IP datagrams. The following description of Peer I/O uses RAS and PPP as an example. In this case, the Peer I/O uses APDU to carry PPP frames.

When RAS sends a message to the card 301, the Peer I/O server 315 forwards the message by sending one or more APDU commands containing the message to the card 301. To enable the card 301 to send a message to RAS, the Peer I/O server 315 polls the card 301 regularly as discussed herein above. Finite State Machines, described in greater detail below, of the Peer I/O server 315 and the Peer I/O client 325 define a mechanism to forward messages of any length without using an explicit fragmentation and assembly mechanism.

Peer I/O Protocol Format

The following defines one implementation of Peer I/O as built on the ISO 7816 communications protocol. Peer I/O implementation is not limited to the following defined class, instruction, and status words set. The Peer I/O Protocol defines a new ISO 7816 class CLA=0x12 for Peer I/O protocol (ISO 7816-4 reserves 0x10-0x7F CLA numbers for future use. ISimplify uses 0x10). Three instructions are defined for this Peer I/O class, namely, POLL, GET_PACKET, and PUT_PACKET. The Peer I/O server 315 uses POLL to poll the card to see if the card wants to send anything; uses GET_PACKET to get data from card; and uses PUT_PACKET to send data to the card. The Peer I/O protocol does not have its own protocol data unit. It uses APDU directly.

A Peer I/O command APDU has the following format:

| 0x12 | INS | Null | Null | Length | (Data) |
|---|---|---|---|---|---|

The instruction INS can be one of the following:
POLL (0xE8): Length=1; Data is one arbitrary byte.
PUT_PACKET (0xEA): Length is the number of bytes of Data sending to the card
GET_PACKET (0xEC): Length is the number of bytes of Data receiving from the card The Length is one byte, so the maximum data length is 256 bytes. Note that POLL command sends one arbitrary byte. This is to avoid ISO 7816 Case I command, which no ACK be sent by the card and some readers do not work well with.

A response APDU has the following format:

| ACK | (Data) | SW1 SW2 |
|---|---|---|

The ACK represents the acknowledgement from the card for receiving the command from the Peer I/O server 315. The ACK is the INC code of the received command. The status of the process on the card side is represented by SW1 and SW2 in the response APDU. For all the three Peer I/O instructions, response status can be the following:
  READY-WRITExx (e.g., 6Cxx): xx represents the number of bytes that the card is ready to send.
  NO-DATA (e.g., 9000): the card is ready to receive.
  9xxx: card sets polling interval.

The reason to use 6Cxx for normal status is the following. The IOP API on the host side does not export status of the APDU command. So 6Cxx is used for the Peer I/O Server 315 to catch it as an exception.

Peer I/O Operation

When RAS sends data to the card, Peer I/O Server 315 issues a PUT_PACKET command to the card. The APDU contains the data.

| 0x12 | PUT_PACKET | Null | Null | Length | Data |
|---|---|---|---|---|---|

When the card wants to send a data to RAS, it has to wait for its opportunity. The Peer I/O Server 315 regularly polls to give the card opportunities to send. The server issues a POLL command.

| 0x12 | POLL | Null | Null | 1 | 1 |
|---|---|---|---|---|---|

After receiving a command APDU from the Peer I/O server 315, the card responds with an ACK first. If the card has no data to send, it sets SW1 SW2 as NO-DATA (e.g., 90 00).

| ACK | 90 00 |
|---|---|

If the card has data to send, it sets SW1 SW2 as 6Cxx, where xx is the length of data that the card intends to send.

| ACK | 6C xx |
|---|---|

When the Peer I/O server 315 receives the response with status READY-WRITE (6Cxx), it issues a GET_PACKET command with Length=xx before issuing any other command.

| 0x12 | GET_PACKET | Null | Null | xx |
|---|---|---|---|---|

The card responds with a response APDU containing data.

| ACK | Data | SW1 SW2 |
|---|---|---|

When the SW1 SW2=6Cxx, the Peer I/O server 315 can issue another GET_PACKET command.

Implementations on a Smart Card

Figure 8:
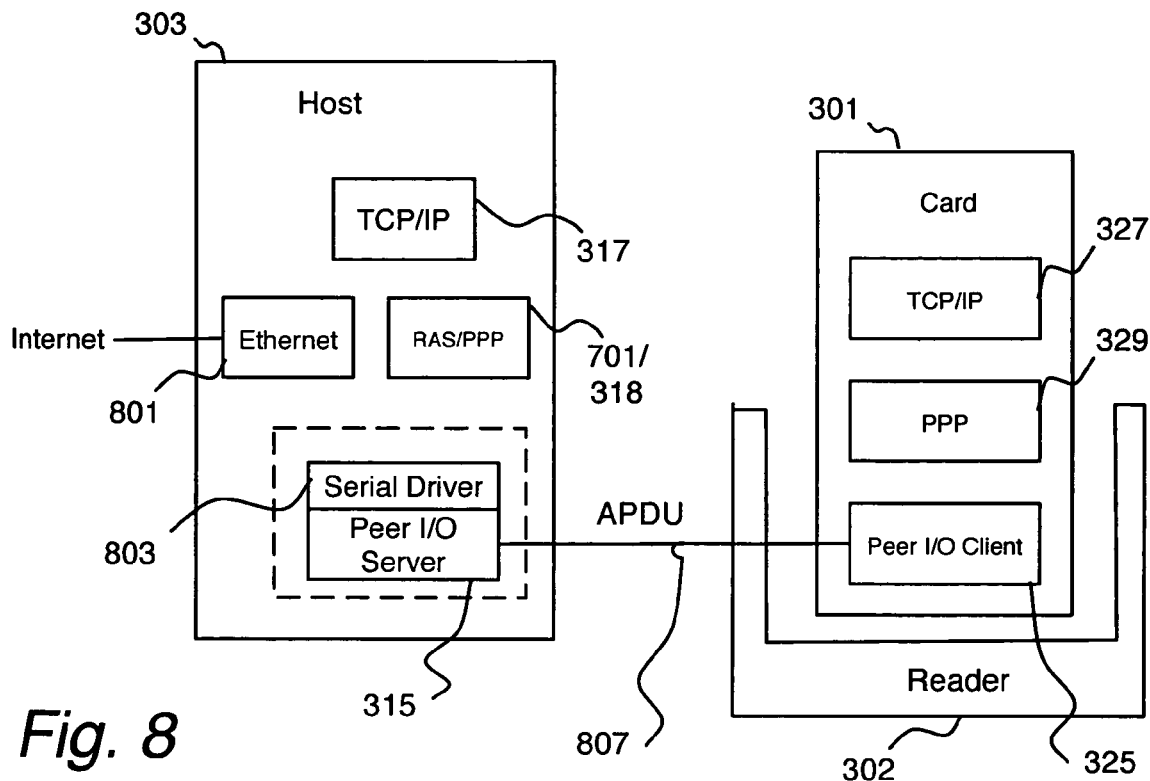
FIG. 8 is a schematic illustration of the components for implementing communication between a smart card and a network wherein the smart card communicates to a host computer using a serial connection having half-duplex serial I/O.

FIGS. 8 and 9 are schematic illustrations of two alternative implementations of the peer-to-peer communications system according to the invention on a smart card system.

FIG. 8 is a schematic illustration of the components for implementing communication between a smart card and a network wherein the smart card communicates to a host computer using a serial connection having half-duplex serial I/O. The smart card 301 connects to the host computer 303 through a reader 302. The driver of the reader implements the Peer I/O server 315. Together with a serial port driver 803, the composite driver behaves as a (virtual) serial port from the perspective of the host computer 303. A normal RAS connection to the virtual serial port enables the network connection to the smart card 301.

The Peer I/O server 315 may also be implemented in hardware in the smart card reader. FIG. 9 is a schematic illustration of the components for implementing communication between a smart card and a network wherein the smart card communicates to a hardware interface device over a half-duplex serial connection and the interface communicates to the host computer using a full-duplex connection. The reader 302 connects to the host computer 303 via serial connection or USB connection. (With USB connection, USB/serial conversions are need in the reader and in the host computer.) Again, a normal RAS connection to the serial port enables the network connection to the smart card 301.

MultiMediaCard (MMC)

In another alternative embodiment the invention described herein is employed to connect MultiMediaCards (MMC) to a network. In this embodiment, MMC cards have much the same role as the network smart cards 201 described herein.

MultiMediaCards (MMC) are small (24 mm×32 mm or 18 mm×1.4 mm), removable, solid-state memory cards for mobile applications, such as cell phones, digital cameras, MP-3 music players, and PDAs. The storage capacity of a MMC is up to 1 Gbyte of data. High speed MMC can transfer data up to 52 Mbits/second. MMCs use flash technology for read/write applications and ROM or flash technology for read only applications.

An MMC has a seven-pin serial interface, which has three communication lines (command, clock and data) and four supply lines. The MMC initialization and data transfer are based on the MMC bus protocol. Each message uses one of the three tokens: Command, Response and Data. A command token starts an operation, which is sent from the host to one or more cards. The response token is sent from the addressed card or cards to the host. The data token can go either way. All bits on the data and command lines are transferred synchronously with the clock.

The Secure MultiMediaCard (Secure MMC) adds smart card security features into the MMC for content protection and e-commerce. It has a tamper resistant module for secure storage and does encryptions and authentication within the card. For example, Infineon Technologies uses its smart card hardware technology in its Secure MMC. The Secure MMC is fully compatible with standard MMC.

Recently, the MultiMediaCard Association (www.mmca.org) has formed a working group to standardize the next generation of Secure MultiMediaCard (Secure MMC) (www.mmca.org/press/SecurityFinal.pdf). The new specification V.2.0 defines an extension to the MMC standard protocol to create a communication interface for incorporating smart card technology. This enables the MMC to provide smart card security features, such as encryption and authentication. The extended MMC command set enables the MMC interface to carry standard smart card ISO-7816 APDUs.

Figure 10:
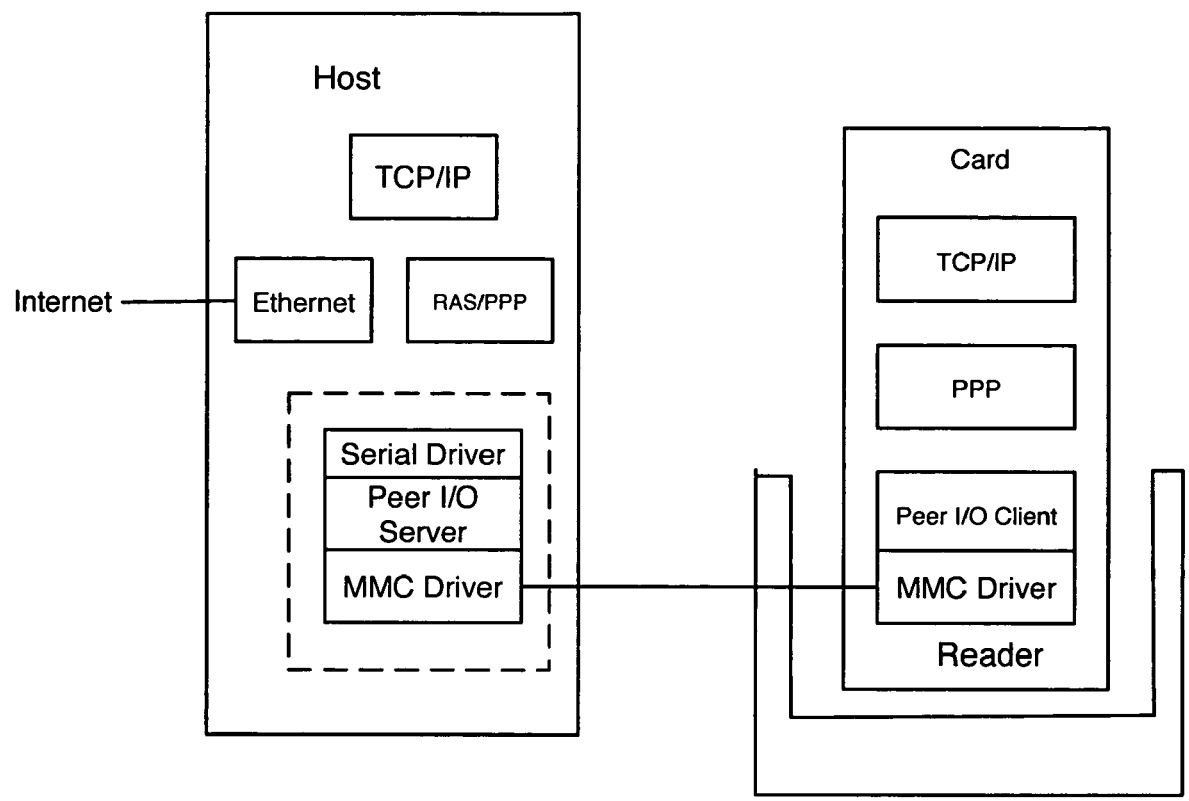
FIG. 10 is a schematic illustration illustrating an embodiment of the components for deploying the invention in conjunction with MMC cards.

The invention described herein for enabling smart cards to be Internet nodes also applies to future Secure MMCs and is illustrated in FIG. 7(e). In this embodiment, the Peer I/O protocol (described in greater detail below) is implemented in a Peer I/O client 325 using the MMC bus protocol to carry Internet protocol data, for example, PPP frames. The SPI is another communication interface to MMC, in addition to MMC bus. Some MMC cards allow selecting MMC or SPI mode. Therefore, the methods presented above in the section describing use of SPI in a network smart card apply to Secure MMC as well. The Secure MMC may also use other multimedia transport protocols to communicate with the host or the network. FIG. 10 illustrates one example configuration for making Secure MMC as an Internet node. Other examples include replacing PPP and Peer I/O by other link layer protocols and replacing TCP by other transport protocols, such as UDP.

Near Field Communication (NFC)

The Near Field Communication (NFC) is a wireless interface and protocol. It is targeted towards the consumer electronics, which are moving from isolated devices to networked devices. The NFC devices communicate by getting close to each other without requiring the user to configure the network. The NFC interface operates in the unregulated RF band of 13.56 MHz. The communication is half-duplex. The operating distances are about 0-20 cm. (NFC is described in "Near Field Communication—white paper," ECMA International, Ecma/TC32-TG 19/2004/1)

The NFC protocol distinguishes between the Initiator and the Target. The Initiator device initiates and controls the data exchange. The Target device answers the request from the Initiator. The NFC protocol has two operation modes: Active mode and Passive mode. In the Active mode, both devices generate their own RF field to carry data. In the Passive mode, only the Initiator generates the RF field, which both the Initiator and Target devices use to transfer the data. The NFC devices set the initial communication speed at 106, 212, or 424 kbit/s. The Active communication mode can reach much higher bit rate, 6 Mbit/s ("Near Field Communication—Interface and Protocol (NFCIP-1)", Standard ECMA-340, December 2002).

The NFC is a very short-range wireless protocol. It is intuitively secure, as two NFC devices have to be very close to each other in order to communicate. The Passive mode of communication is an important feature of NFC. Battery-powered mobile devices, such as a mobile phone, or mobile devices without power source can communicate with other NFC devices without having to generating RF field.

The NFC devices exchange data using NFC's data exchange protocol (DEP). The DEP is a Request/Response protocol. The Initiator sends a Request and the Target transmits a Response. The NFC devices that do not generate RF field always operate in the Passive mode of communication and are Target devices. They are in a similar situation as the standard ISO 7816 or ISO 14443 smart cards. Similar to the techniques described herein above we can implement Peer I/O using DEP. For example, we can use the undefined bit setting of the DEP protocol header to define the Peer I/O commands.

If the network protocol is implemented in the passive NFC target device, Peer I/O will enable such device to behave as a network peer, that is, to become an active device.

Other Applications

The Dallas Semiconductor's iButton is a computer chip enclosed in a 16 mm stainless steel can iButton, http://www.ibutton.com.

The iButton can be attached to a key fob, ring, watch, or other personal items. The applications of the iButton include access control to buildings and computers. The iButton communicates with the host computer through a reader/writer device. The communications use a 1-wire protocol, with which data transfers are bit-sequential and half-duplex. The iButton is considered as a slave while the host with a reader/writer is a master. The Peer I/O can be implemented using the iButton's 1-wire protocol. The implementation will enable the iButton to become an active peer and to initiate communications.

Many other devices use half-duplex serial command/response (master/slave) communication protocols; for example, remote monitoring devices (e.g., Satellite Modem Monitoring, patient home monitoring), audio devices, and various control systems. The Peer I/O implementation may enable such devices to support networking protocols and to be active peers in a network.

From the foregoing it will be appreciated that the peer-to-peer communications method and system provided by the invention provides efficient and flexible peer-to-peer communication allowing a resource-constrained device to communicate as a network peer. An electronic device incorporating logic implementing or operating according to the method of the invention may, even though designed to communicate to a host device over a half-duplex serial command/response communications link, appear to be communicate in an asynchronous full-duplex manner. The system and method for peer-to-peer communication according to the invention adds minimal power consumption to the host and resource-constrained devices and may therefore be favorably deployed in small portable devices with limited power supply capabilities. Thus the system and method of peer-to-peer communication according to the invention provides several advantages over existing communications systems.

Although specific embodiments of the invention have been described and illustrated, the invention is not to be limited to

What is claimed is the following:

1. A method of communication between a resource-constrained device, solely capable of half-duplex communication, a host computer and remote network nodes over a network wherein the host computer and the remote network nodes communicate with the resource-constrained device using un-modified network clients and servers and wherein the resource-constrained device has a central processing unit, a random access memory, a non-volatile memory, a read-only memory, and an input and output component, the resource-constrained device connected to the host computer over a physical communications link connection, comprising:
   establishing a physical link connection between the resource-constrained device and the host computer via an interface device;
   executing on the resource-constrained device a communications module implementing networking protocols and one or more link layer communication protocols, operable to communicate with an interface device, and operable to communicate with remote network nodes;
   operating the resource-constrained device according to a communications module, wherein the communication module is driven by input events and by one or more secure network applications executing on the resource-constrained device wherein the network applications call upon the communication module of the resource-constrained device to communicate with the host computer and the remote network node;
   operating the interface device according to a first finite state machine permitting the interface device to forward messages between the resource constrained device and the network wherein the interface device is in one of the at least one states permitting the resource constrained device to initiate and send messages according to a peer-to-peer communication protocol, and delaying interaction with the resource-constrained device for a time period in response to the resource-constrained device indicating no intent to initiate and send messages;
   operating the resource constrained device according to a second finite state machine permitting the resource constrained device to transmit messages according to a peer-to-peer communication protocol to the host computer or a remote network node via the interface device; and
   operating the resource constrained device to set a polling-interval indicating to the interface device the interval between polling message transmissions from the interface device to the resource constrained device thereby reducing power consumption.

2. The method of communication between a resource-constrained device, a host computer and remote network nodes of claim 1 wherein the interface device is a hardware device connected between the host computer and the resource-constrained device.

3. The method of communication between a resource-constrained device, a host computer and remote network nodes of claim 1 wherein the interface device is a software module executing on the host computer between the physical link and communications modules implementing higher level communications protocols.

4. The method of communication between a resource-constrained device, a host computer and remote network nodes of claim 1 further comprising operating the interface device to perform a bridging function between the half-duplex serial connection and the full-duplex connection.

5. The method of communication between a resource-constrained device, a host computer and remote network nodes of claim 4 wherein the step of performing a bridging function further comprises providing at least one of function selected from:
   enabling a resource constrained device operating in a command/response mode to communicate with network nodes as a peer;
   enabling a resource constrained device operating in half-duplex serial communication mode to handle full-duplex communication traffic;
   encapsulating upper layer protocol frames;
   enabling transportation of upper layer protocol frames exceeding a frame size limit of the lower link layer; and
   supporting multiple logical connections of upper layer protocols.

6. The method of communication between a resource-constrained device, a host computer and remote network nodes of claim 1 wherein the first finite state machine comprises:
   a polling state indicating that the interface device has polled the resource-constrained device to inquire whether the resource-constrained device has data to send;
   a checking-network state indicating that the interface device is prepared to receive data from remote devices on the network;
   a getting-data-from-client state indicating that the interface device has received a message from the resource-constrained device indicating that the resource-constrained device has data to send; and
   a putting-data-to-client state indicating that the interface device has data received from the network the data being directed to the resource-constrained device.

7. The method of communication between a resource-constrained device, a host computer and remote network nodes of claim 6 further comprising:
   operating the interface device to carry out the steps:
      polling the resource-constrained device over a half-duplex command-response communications link and taking a transition from the checking-network state to the polling state in response to a condition triggered by the expiration of preset time-out interval; and
      getting a packet from the resource-constrained device and taking a transition from the polling state to the getting-data-from-client state in response to a condition triggered by the resource-constrained device in response to being polled responding with a client-has-data response message;
      setting the time-out interval in response to the resource-constrained device in response to being polled respond with a client-has-no-data response message wherein the timeout interval is a parameter of the response message; and
      putting a packet to the resource-constrained device in response to receiving data from the network and overriding the timeout interval to do so.

8. The method of communication between a resource-constrained device, a host computer and remote network nodes of claim 7 further comprising operating the resource-constrained device according to a second state machine having:
   a wait-for-upper-level state indicating that the resource-constrained device communication module is waiting for upper level protocol communications;
   a wait-for-server-ready-write state indicating that the electronic device has data to transmit;
   a wait-server-ready-read state indicating that the resource-constrained device is prepared to read data.

9. The method of communication between a resource-constrained device, a host computer and remote network nodes of claim 8 further comprising operating the resource-constrained device to carry out the steps:
in response to an upper level write command while in the wait-for-upper-level, transitioning from the wait-for-upper-level state to the wait-for-server-ready-write state;
in response to a polling message received over the half-duplex command-response communications link while in the wait-for-server-ready-write state, transmitting a client-has-data message and remaining in the wait-for-server-ready-write state;
in response to a polling message received over the half-duplex command-response communications link while in the wait-for-server-ready-read state, transmitting a client-has-no-data message and remaining in the wait-for-server-ready-read state.

10. A system having a master device and a slave device communicating over a synchronous half-duplex serial link, the link being configured to transport asynchronous logic full-duplex protocols between the slave device and a host computer or remote network node, the system comprising:
a physical link between the master device and slave device,
the master device configured to periodically send packets to the slave device even when the master device has no data ready to send, the master device operates according to a first state machine permitting the master device to forward messages between the slave device and the network wherein the master device is in one of the at least one states permitting the slave device to initiate and send messages according to a peer-to-peer communication protocol, wherein the first state machine comprises at least one state in which the master device waits a period specified by the slave device prior to proceeding with further interactions with the slave device,
the slave device configured to answer in minimum interval, not waiting to process commands that may be pending or immediately received, with a response packet of currently available data, even when the slave device has no data ready to send, the slave device operates according to a second finite state machine permitting the slave constrained device to transmit messages according to a peer-to-peer communication protocol to a host computer or a remote network node, the response packet containing zero or more of responses to prior host requests or requests initiated by the slave device, and
the slave device configured to set a polling-interval indicating to the master device the interval between polling message transmissions from the master device to the slave device thereby reducing power consumption.

11. The system of claim 10 where the polling-interval periodically is adjusted to meet the needs of the master device or slave device for balancing power consumption and communication latency.

12. The system of claim 10 where the polling-interval is periodically determined by incoming requests to the master device from an external source.

13. The system of claim 10 where the logical full duplex protocols being transported are one or more from the following list of internet protocols: Ethernet, PPP, IP, TCP, UDP, ICMP, DHCP, HTTP, HTTPS, FTP, Telnet, SSH.

14. The system of claim 10 wherein the slave device is a short range radio device comprising a communications module operable, in response to receiving an inquiry concerning whether the short range device has data to transmit, if the short range device has no data to transmit, transmitting a response that includes a polling-interval, and wherein the master device is a radio device comprising a communications module operable to wait for the specified polling-interval to expire prior to commencing further communication to the slave device.

15. The system of claim 10, wherein the first finite state machine comprises:
a polling state indicating that the interface device has polled the electronic device to inquire whether the resource-constrained device has data to send;
a checking-network state indicating that the interface device is prepared to receive data from remote devices on the network;
a getting-data-from-client state indicating that the interface device has received indicating a message from the resource-constrained device indicating that the resource-constrained device has data to send; and
a putting-data-to-client state indicating that the interface device has data received from the network the data being directed to the resource-constrained device.

16. The system of claim 15 wherein the master device is operable to carry out the steps:
polling the resource-constrained device over a half-duplex command-response communications link and taking a transition from the checking-network state to the polling state in response to a condition triggered by the expiration of preset time-out interval; and
getting a packet from the resource-constrained device and taking a transition from the polling state to the getting-data-from-client state in response to a condition triggered by the resource-constrained device in response to being polled responding with a client-has-data response message;
setting the time-out interval in response to the resource-constrained device in response to being polled respond with a client-has-no-data response message wherein the timeout interval is a parameter of the response message; and
putting a packet to the resource-constrained device in response to receiving data from the network and overriding the timeout interval to do so.

17. The system of claim 16 wherein the second state machine comprises:
a wait-for-upper-level state indicating that the resource-constrained device communication module is waiting for upper level protocol communications;
a wait-for-server-ready-write state indicating that the electronic device has data to transmit;
a wait-server-ready-read state indicating that the resource-constrained device is prepared to read data.

18. The system of claim 17 wherein the slave device is operable to carry out the steps:
in response to an upper level write command while in the wait-for-upper-level, transitioning from the wait-for-upper-level state to the wait-for-server-ready-write state;
in response to a polling message received over the half-duplex command-response communications link while in the wait-for-server-ready-write state, transmitting a client-has-data message and remaining in the wait-for-server-ready-write state;
in response to a polling message received over the half-duplex command-response communications link while in the wait-for-server-ready-read state, transmitting a client-has-no-data message and remaining in the wait-for-server-ready-read state.

19. A system having a master device and a slave device communicating over a synchronous half-duplex serial link, the link being configured to transport asynchronous logic full-duplex protocols between the slave device and a host computer or remote network node, the master device and slave device each comprise a computer readable non-transitory storage medium having instructions causing the master device and slave device to perform the tasks of the master device and slave device, respectively, in a method having the steps:

establishing a physical link between the master device and slave device, configuring the master device to periodically send packets to the slave device even when the master device has no data ready to send, the master device operates according to a first state machine permitting the master device to forward messages between the slave device and the network wherein the master device is in one of the at least one states permitting the slave device to initiate and send messages according to a peer-to-peer communication protocol, wherein the first state machine comprises at least one state in which the master device waits a period specified by the slave device prior to proceeding with further interactions with the slave device, configuring the slave device to answer in minimum interval, not waiting to process commands that may be pending or immediately received, with a response packet of currently available data, even when the slave device has no data ready to send, the slave device operates according to a second finite state machine permitting the slave constrained device to transmit messages according to a peer-to-peer communication protocol to a host computer or a remote network node, the response packet containing zero or more of responses to prior host requests or requests initiated by the slave device, and operating the slave device to set a polling-interval indicating to the master device the interval between polling message transmissions from the master device to the slave device thereby reducing power consumption.

20. The system of claim 19 where the polling-interval periodically is adjusted to meet the needs of the master device or slave device for balancing power consumption and communication latency.

21. The system of claim 19 where the polling-interval is periodically determined by incoming requests to the master device from an external source.

22. The system of claim 19 where the logical full duplex protocols being transported are one or more from the following list of internet protocols: Ethernet, PPP, IP, TCP, UDP, ICMP, DHCP, HTTP, HTTPS, FTP, Telnet, SSH.

23. The system of claim 19 wherein the slave device is a short range radio device comprising a communications module operable, in response to receiving an inquiry concerning whether the short range device has data to transmit, if the short range device has no data to transmit, transmitting a response that includes a polling-interval, and wherein the master device is a radio device comprising a communications module operable to wait for the specified polling-interval to expire prior to commencing further communication to the slave device.

* * * * *